United States Patent
Hongell et al.

(10) Patent No.: US 7,409,386 B2
(45) Date of Patent: Aug. 5, 2008

(54) METHOD AND APPARATUS FOR EXECUTING A QUERY ON DYNAMIC PROPERTIES OF OBJECTS IN A DATABASE

(75) Inventors: George F. Hongell, Santa Clara, CA (US); Chih-Cheng Hsu, Los Angeles, CA (US); Harisch R. Nayak, Morgan Hill, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/743,096

(22) Filed: May 1, 2007

(65) Prior Publication Data

US 2007/0203941 A1    Aug. 30, 2007

Related U.S. Application Data

(63) Continuation of application No. 09/860,004, filed on May 17, 2001, now Pat. No. 7,263,514.

(51) Int. Cl.
G06F 17/30 (2006.01)
G06F 9/44 (2006.01)

(52) U.S. Cl. .................. 707/3; 707/2; 707/3; 707/4; 707/10; 707/100; 717/113; 717/103; 717/102

(58) Field of Classification Search .......... 707/2, 707/3, 4, 10, 100; 717/102, 103, 113
See application file for complete search history.

(56) References Cited

U.S. PATENT DOCUMENTS 5,673,401 A     9/1997  Volk et al.
5,764,226 A     6/1998  Consolatti et al.
5,813,020 A     9/1998  Hohensee et al.

(Continued)

FOREIGN PATENT DOCUMENTS

EP     0877328     11/1998

(Continued)

OTHER PUBLICATIONS

"Dynamic Property Evaluation in Virtual Market Places," Research Disclosure, Jun. 1999, 1 page.

*Primary Examiner*—Shahid Alam
*Assistant Examiner*—Fred I Ehichioya
(74) *Attorney, Agent, or Firm*—Sawyer Law Group LLP

(57) ABSTRACT

Methods and apparatus for executing a query on dynamic properties of a plurality of objects in a database are provided. In one implementation, the method includes obtaining a query; determining that a first portion of the query comprises a method for accessing a dynamic property of the plurality of objects; obtaining mapping data associated with the dynamic property of the plurality of objects, the mapping data mapping the dynamic property to a pre-determined location in the database; translating the first portion of the query in accordance with the mapping data such that the first portion of the query is executable against the pre-determined location in the database without creating instances of the plurality of objects; executing the query including executing the translated first portion of the query without creating instances of the plurality of objects; and displaying a result of the executed query to a user.

11 Claims, 3 Drawing Sheets

U.S. PATENT DOCUMENTS

| | | |
|---|---|---|
| 6,119,125 A | 9/2000 | Gloudeman et al. |
| 6,304,879 B1 | 10/2001 | Sobeski et al. |
| 6,430,556 B1 | 8/2002 | Goldberg et al. |
| 6,564,368 B1 * | 5/2003 | Beckett et al. .............. 717/113 |

FOREIGN PATENT DOCUMENTS

| | | |
|---|---|---|
| EP | 0877328 A2 * | 11/1998 |
| JP | 05183508 | 3/1995 |
| JP | 02185932 | 3/2002 |
| WO | 9514969 | 6/1995 |

* cited by examiner

FIG. 1 *(PRIOR ART)*

METHOD AND APPARATUS FOR EXECUTING A QUERY ON DYNAMIC PROPERTIES OF OBJECTS IN A DATABASE

CROSS REFERENCE TO RELATED APPLICATIONS

This application is a continuation of application Ser. No. 09/860,004, filed May 17, 2001 now U.S. Pat. No. 7,263,514, the entire contents of which are incorporated by reference herein.

FIELD OF THE INVENTION

The present invention relates to database networks, and more particularly to the execution of queries on objects in the database networks.

BACKGROUND OF THE INVENTION

FIG. 1 illustrates a conventional database network. The database network comprises a plurality of clients 102, a network server 104, a Web Sphere™ server 106, and a database 108 containing objects. The WebSphere server 106 is an application server, developed by International Business Machines Corporation, of Armonk, N.Y., which functions as an extension to the network server 104. The WebSphere server 106 allows users to write object-oriented application programs and to design or install custom objects. These objects are stored as table structures in the database 108. The WebSphere server 106 is typically used with relational database systems, such as DB2™ or Oracle™.

The objects in the database 108 have class definitions. The class definitions contain information concerning static properties associated with the objects. Static properties are the attributes defined in the class definition. Each of the static properties is mapped to a table column in the database 108, and this mapping data is stored as metadata. The metadata takes the similar form of a Structured Query Language (SQL) view and the query translation processes are based on relational view rewrite. Some objects also have dynamic property capabilities. Dynamic properties on the contrary are not defined in the class definition. Dynamic properties are typically used for customizing an application without changing the class definition. Dynamic properties can be accessed using getPropertyBy and can be set using setPropertyBy methods that are defined in the class definition. By storing these data as dynamic properties, the user need not change the class definition of an object each time a dynamic property is added or deleted. As with static properties, the dynamic properties may each be mapped to a table column in the database 108. Alternatively, one or more of the dynamic properties may be unmapped, and instead are stored in an overflow column.

Oftentimes, a user wishes to execute queries on the objects in the database 108. The WebSphere server 106 contains a query service 110 for this purpose. For static properties, the query refers to the attributes of the class definitions for the objects. Using metadata, the query system translates the query into a query against the database schema, and this is referred to as "pushdown". If a query contains a method, instances of objects must be created and methods must be run on these instances, and this is referred to as running "in object space". Because dynamic properties are accessed using the methods, evaluating the queries with dynamic properties is done in object space. Running queries in object space is usually slower than pushdown, and thus is inefficient.

BRIEF SUMMARY OF THE INVENTION

In general, in one aspect, this specification describes methods and apparatus for executing a query on dynamic properties of a plurality of objects in a database are provided. In one implementation, the method includes obtaining a query; determining that a first portion of the query comprises a method for accessing a dynamic property of the plurality of objects; obtaining mapping data associated with the dynamic property of the plurality of objects, the mapping data mapping the dynamic property to a pre-determined location in the database; translating the first portion of the query in accordance with the mapping data such that the first portion of the query is executable against a the pre-determined location in the database without creating instances of the plurality of objects; executing the query including executing the translated first portion of the query without creating instances of the plurality of objects; and displaying a result of the executed query to a user.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

This specification describes a method for efficient object query on dynamic properties. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

The method in accordance with the present invention performs the query on mapped dynamic properties of objects against the class definitions of the objects. The method uses the stored mapping data on the dynamic properties to translate the part of the query pertaining to the mapped dynamic properties such that they are run against the database. In this manner, queries on mapped dynamic properties are performed through pushdown rather than in object space. This increases the efficiency of the queries.

To more particularly describe the features of the present invention, please refer to FIGS. 2 and 3 in conjunction with the discussion below.

Figure 1:
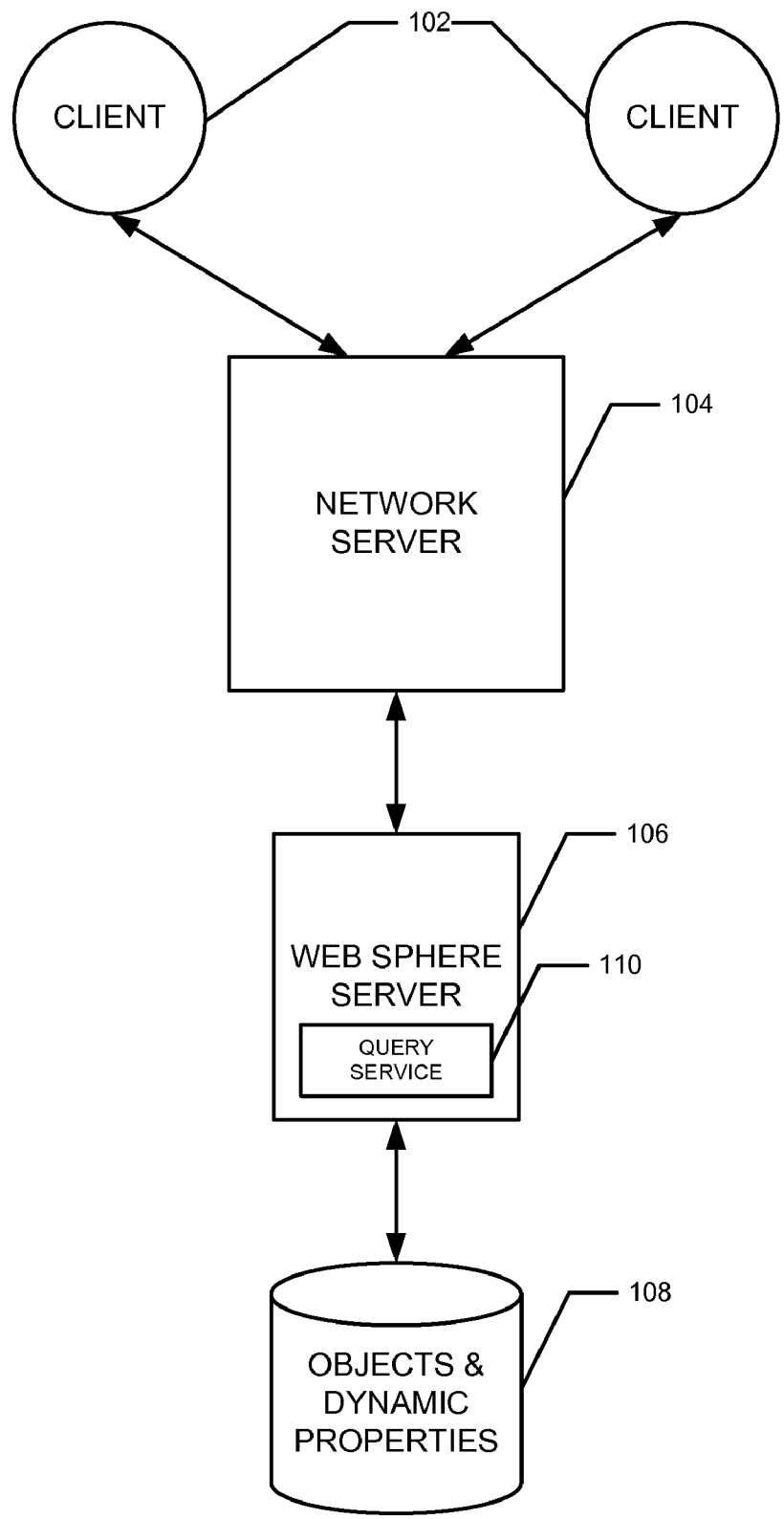
FIG. 1 illustrates a conventional database network.
Figure 2:
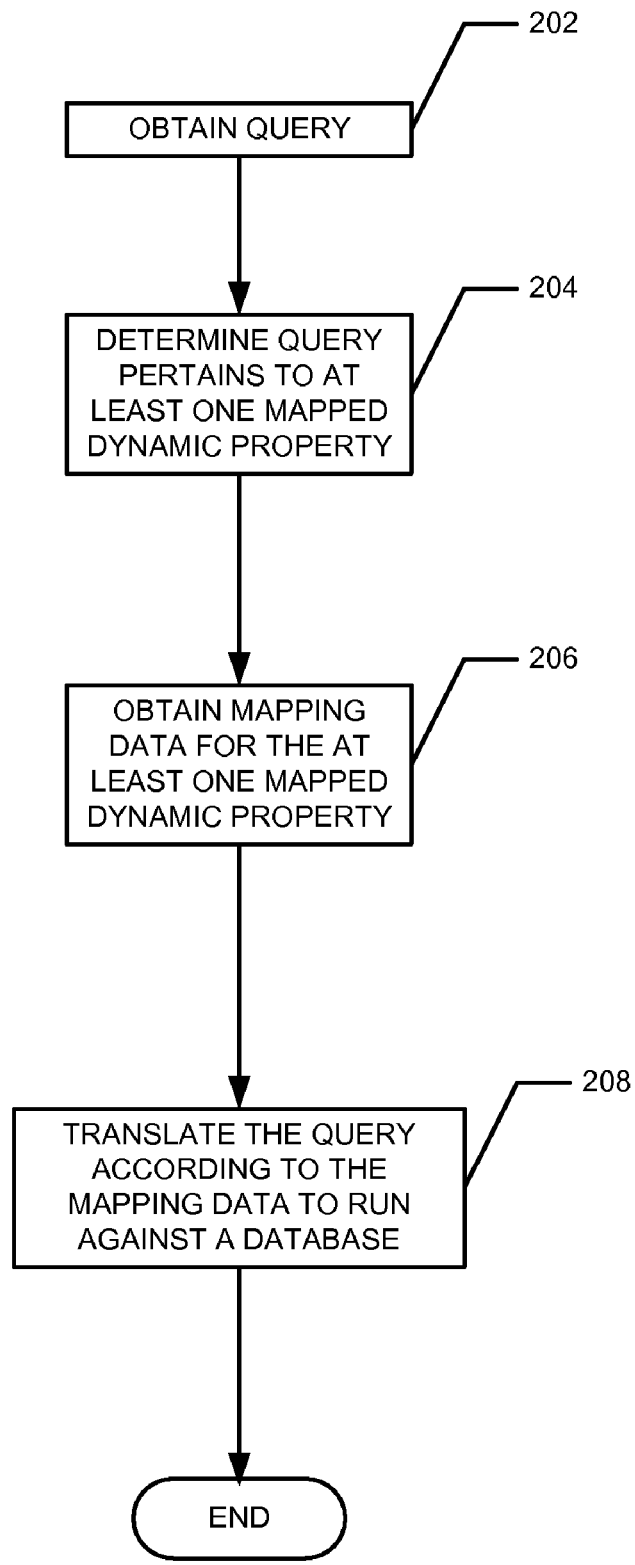
FIG. 2 is a flowchart illustrating a method for executing a query on dynamic properties of objects in accordance with one implementation.

FIG. 2 is a flowchart illustrating a method for an object query on dynamic properties in accordance with one implementation. First, the query is obtained, via step 202. The query service 110 then determines that at least part of the query pertains to at least one mapped dynamic property, via step 204. The mapping data for the at least one mapped dynamic property is then obtained, via step 206. This mapping data is used to translate the query to run against the database 108, via step 208. The query is then executed by the query service 110.

For example, consider the following employee class definition:

```
class employee {
    public int P1;
    public int P2;
    public Object getPropertyBy(String name);
    public void setPropertyBy(String name, Object value);
}
```

Assume that the employee class contains two static properties, P1 and P2, which are respectively mapped to column 1 (C1) and column 2 (C2) of the database 108 of a table structure in the database 108. Assume that the employee class also contains three dynamic properties, A1, A 2, and A3. A1 is mapped to column 3 (C3), and A2 is mapped to column 4 (C4). However, A3 is unmapped and thus is stored in the overflow column.

Assume that the following Object Oriented Structured Query Language (OOSQL) query has been obtained, via step 202:

```
Select e from eHome e
    where
        cast (e.getPropertyBy ("A1") as double) > 21;
```

This query is seeking the collection of objects, "e", of the type employee from the collection of all employees in "eHome", which satisfies the conditions which follow "where". The cast operator is used in OOSQL when dealing with attributes or methods that return type object. Since the type of the value cannot be deduced from the class definition, the OOSQL cast operator must be used to specify this information in the query. Thus, the cast function is to convert the expression obtained by e.getPropertyBy("A1") into the "double" data type.

Since the query refers to A1, the query service 110 determines that the query pertains to at least one mapped dynamic property, via step 204. Using the metadata:

create object_view view1 signature(int P1,int P2,double A1,double A2) as select q1.C1,q1.C2,q1.C3,q1.C4 from eTable q1;

the query service 110 obtains the mapping data for A1, i.e., that A1 is mapped to C3, via step 206. The query service 110 then translates the query so that the part pertaining to A1 is run against column C3 of the database 108, via step 208. In one implementation, the translation is performed by replacing the cast statement for A1 with column C3 of the database. The translated OOSQL query then reads:

```
Select make_object (q1.*) from eTable q1
    where
        C3 > 21;
```

The above OOSQL query is then translated into the database query:

```
select q1.* from eTable q1
    where
        C3 > 21.
```

This query is then executed. Since the translated query now refers to a column in the table, the query may be run against the table's class definition, and no methods are run on the instances of the objects. The make_object function which constructs object references is done by the query service 110. In this manner, the query which pertains to a mapped dynamic property is performed through pushdown, and not in object space.

Figure 3:
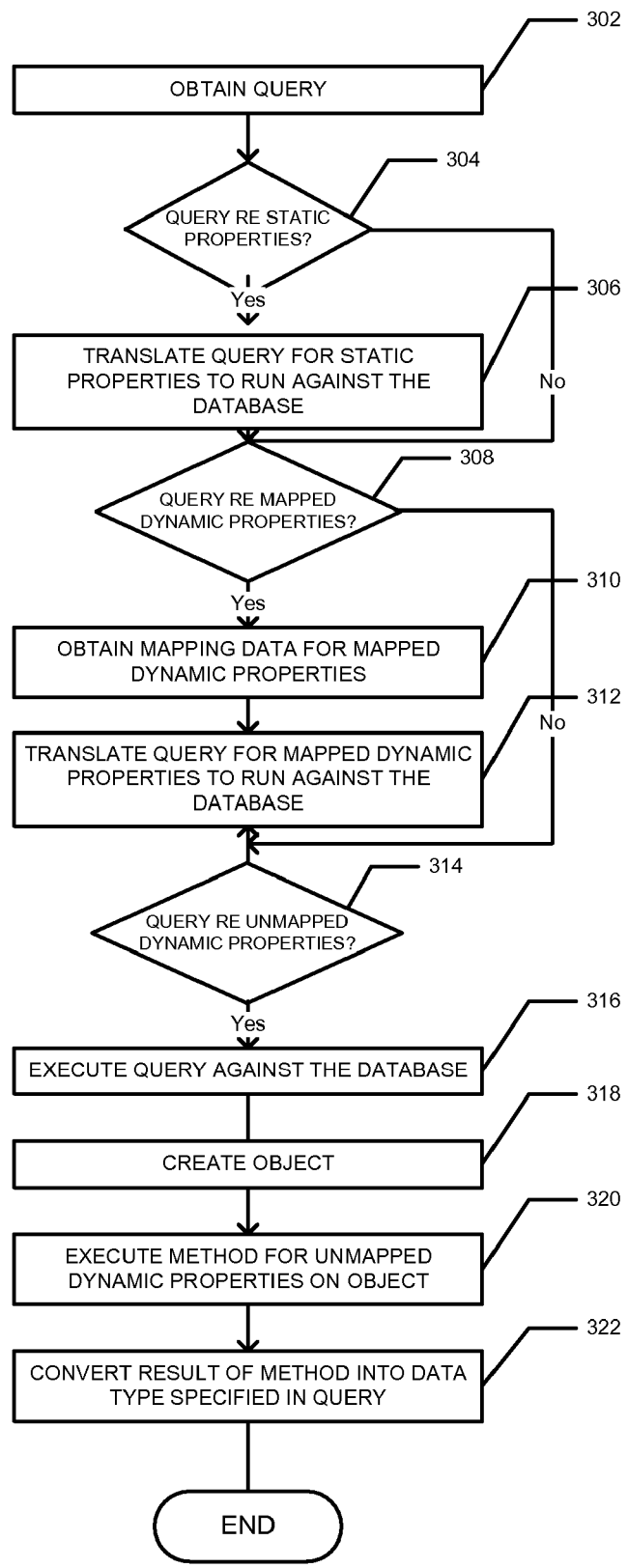
FIG. 3 is a flowchart illustrating in more detail the method for executing a query on dynamic properties of objects in accordance with one implementation.

FIG. 3 is a flowchart illustrating in more detail the method for an object query on dynamic properties in accordance with one implementation. For illustrative purposes, assume that the following OOSQL query is obtained, via step 302:

```
Select e from eHome e
    where
        cast (e.getPropertyBy ("A1") as double) > 21
        and P1 > 0
        and cast (e.getPropertyBy("A3") as double) > 25;
```

First, the query service 110 determines whether the query pertains to static properties, via step 304. Since the query has the condition "P1>0", P1 being a static property, the query service 110 then obtains the mapping data for P1, i.e., P1 is mapped to C1, via step 306. In one implementation, the translation is performed by replacing "P1" with its column, "C1".

Next, the query service 110 determines whether the query pertains to mapped dynamic properties, via step 308. Since the query has the condition "cast (e.getPropertyBy ("A1") as double)>21", A1 being a mapped dynamic property, the query service 110 obtains the mapping data for A1, i.e., A1 is mapped to C3, via step 310, and translates the part of the query pertaining to A1 to run against the database 108, via step 312. In one implementation, the translation is performed by replacing A1 with column C3 of the database 108.

Next, the query service 110 determines whether the query pertains to unmapped dynamic properties, via step 314. Since the query has the condition "cast (e.getPropertyBy ("A3") as double)>25", A3 being an unmapped dynamic property, the query service 110 has no mapping data for A3. The OOSQL query then reads:

```
select make_object (q1.*)from eTable q1
    where
        q1.C3 > 21
        and q1.C1 > 0
        and cast (make_object(q1.*).getPropertyBy("A3") as double) > 25;
```

The query service 110 then decomposes the OOSQL query into a database SQL query:

```
select q1.*from eTable q1
    where
        q1.C3 > 21
        and q1.C1 > 0.
```

The query is then executed, via step 316. The make_object function which constructs object references, via step 318, and invocation of the getPropertyBy method for the unmapped dynamic property, via step 320, and converting the expression obtained by getPropertyBy("A3") into double data type, via step 322, is performed by the query service 110.

A method for an object query on dynamic properties has been disclosed. The method performs the query on mapped dynamic properties of objects against the database. The method uses the stored mapping data on the dynamic properties to translate the query on the mapped dynamic properties such that they may be run against the database. In this manner, queries on mapped dynamic properties are performed through pushdown rather than in object space.

Although the present invention has been described in accordance with the embodiments shown, variations may be made to the embodiments and those variations would be within the scope of the present invention.

What is claimed is:

1. A method for executing a query on dynamic properties of a plurality of objects in a database, the method comprising:
   obtaining a query;
   in response to determining that a first portion of the query comprises a method for accessing a dynamic property of the plurality of objects;
      obtaining mapping data associated with the dynamic property of the plurality of objects, the mapping data mapping the dynamic property to a pre-determined location in the database;
      translating the first portion of the query comprising the method for accessing the dynamic property in accordance with the mapping data such that the first portion of the query is executable against a the pre-determined location in the database without creating instances of the plurality of objects;
      executing the query including executing the translated first portion of the query without creating instances of the plurality of objects;
   in response to determining that a second portion of the query comprises a reference to a static property of the plurality of objects
      translating the second portion of the query comprising the reference to the static property to execute against the database; and
   in response to determining that a third portion of the query comprises a method for accessing an unmapped dynamic property of the plurality of objects
      creating an instance of the plurality of objects;
      executing the method for accessing the unmapped dynamic property on the instance of the plurality of objects; and
      converting a result of the executed method into a data type specified in the query; and
   displaying a result of the executed query to a user.

2. The method of claim 1, wherein the query is an Object Oriented Structured Query Language (OOSQL) query.

3. The method of claim 1, wherein the database comprises a relational database system.

4. A computer readable medium encoded with a computer program for executing a query on dynamic properties of a plurality of objects in a database, the computer program comprising computer executable code for:
   obtaining a query;
   in response to determining that a first portion of the query comprises a method for accessing a dynamic property of the plurality of objects;
      obtaining mapping data associated with the dynamic property of the plurality of objects, the mapping data mapping the dynamic property to a pre-determined location in the database;
      translating the first portion of the query comprising the method for accessing the dynamic property in accordance with the mapping data such that the first portion of the query is executable against a the pre-determined location in the database without creating instances of the plurality of objects;
      executing the query including executing the translated first portion of the query without creating instances of the plurality of objects;
   in response to determining that a second portion of the query comprises a reference to a static property of the plurality of objects
      translating the second portion of the query comprising the reference to the static property to execute against the database; and
   in response to determining that a third portion of the query comprises a method for accessing an unmapped dynamic property of the plurality of objects
      creating an instance of the plurality of objects;
      executing the method for accessing the unmapped dynamic property on the instance of the plurality of objects; and
      converting a result of the executed method into a data type specified in the gquery; and
   displaying a result of the executed query to a user.

5. The computer readable medium of claim 4, further comprising computer executable code for:
   determining that a third portion of the query comprises a method for accessing an unmapped dynamic property of the plurality of objects,
   wherein executing the query further includes
      creating an instance of the plurality of objects;
      executing the method for accessing the unmapped dynamic property on the instance of the plurality of objects; and
      converting a result of the executed method into a data type specified in the query.

6. The computer readable medium of claim 4, wherein the query is an Object Oriented Structured Query Language (OOSQL) query.

7. The computer readable medium of claim 4, wherein the database comprises a relational database system.

8. A system for executing a query on dynamic properties of a plurality of objects in a database, the system comprising:
   a database including a table, the table comprising a plurality of columns; and
   a server coupled to the database, the server comprising a query service, wherein the query service is configured to
      obtain a query, wherein in response to a first portion of the query comprising a
   method for accessing a dynamic property of the plurality of objects, the query service is configured to
      execute the query including executing the first portion of the query comprising the a method for accessing the dynamic property of the plurality of objects without creating instances of the plurality of objects; and
   in response to a second portion of the query including a reference to a static property of the plurality of objects; the query service is configured to
      translate the second portion of the query comprising the reference to the static property to execute against the database; and in response to a third portion of the query including a method for accessing an unmapped dynamic property of the plurality of objects, the query is configured to creating an instance of the plurality of objects;

executing the method for accessing the unmapped dynamic property on the instance of the plurality of objects; and converting a result of the executed method into a data type specified in the query; and display a result of the executed query to a user.

9. The system of claim 8, wherein the query service executing the query comprising the method for accessing the dynamic property includes the query service:

obtaining mapping data associated with the dynamic property of the plurality of objects, the mapping data mapping the dynamic property to a pre-determined location in the database; and translating the first portion of the query comprising the method for accessing the dynamic property in accordance with the mapping data to execute against the pre-determined location in the database without creating instances of the plurality of objects.

10. The system of claim 8, wherein the query is an Object Oriented Structured Query Language (OOSQL) query.

11. The system of claim 8, wherein the database comprises a relational database system.

* * * * *